United States Patent
Iio et al.

(10) Patent No.: US 11,307,669 B2
(45) Date of Patent: Apr. 19, 2022

(54) ELECTRONIC DEVICE, MOVING BODY, PROGRAM AND CONTROL METHOD

(71) Applicant: KYOCERA Corporation, Kyoto (JP)

(72) Inventors: Taro Iio, Yokohama (JP); Yuya Yamaguchi, Yokohama (JP); Ryohei Nakamura, Yokohama (JP); Tsuneo Miyashita, Yokohama (JP); Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/968,252

(22) PCT Filed: Feb. 7, 2019

(86) PCT No.: PCT/JP2019/004489
§ 371 (c)(1),
(2) Date: Aug. 7, 2020

(87) PCT Pub. No.: WO2019/159818
PCT Pub. Date: Aug. 22, 2019

(65) Prior Publication Data
US 2020/0371601 A1    Nov. 26, 2020

(30) Foreign Application Priority Data

Feb. 14, 2018    (JP) .............................. JP2018-024137

(51) Int. Cl.
*G06F 3/01* (2006.01)
*B60K 37/02* (2006.01)
(Continued)

(52) U.S. Cl.
CPC .............. *G06F 3/017* (2013.01); *B60K 37/02* (2013.01); *G01C 21/3664* (2013.01);
(Continued)

(58) Field of Classification Search
CPC .............. B60K 37/02; B60K 2370/736; B60K 2370/166; B60K 2370/741;
(Continued)

(56) References Cited

U.S. PATENT DOCUMENTS 9,547,792 B2    1/2017    Terada et al.
9,671,867 B2    6/2017    Bachfischer et al.
(Continued)

FOREIGN PATENT DOCUMENTS

DE    10 2006 037 156 A1    9/2007
EP    2 743 799 A2    6/2014
(Continued)

*Primary Examiner* — Christopher E Leiby
(74) *Attorney, Agent, or Firm* — Studebaker & Brackett PC

(57) ABSTRACT

Provided is an electronic device comprising a sensor configured to detect a gesture without touching an own device and a controller configured to determine a hand of a user used for operation according to a driver's seat position and determine, according to the hand of the user used for operation, a direction of the gesture based on an output from the sensor.

13 Claims, 12 Drawing Sheets

(51) Int. Cl.
   *G01C 21/36* (2006.01)
   *G06V 40/20* (2022.01)
(52) U.S. Cl.
   CPC ...... *G06V 40/28* (2022.01); *B60K 2370/1464* (2019.05); *B60K 2370/166* (2019.05); *B60K 2370/736* (2019.05); *B60K 2370/741* (2019.05)
(58) Field of Classification Search
   CPC ............ B60K 2370/1464; G01C 21/26; G01C 21/3664; G06K 9/00355; G06F 3/01; G06F 3/017
   See application file for complete search history.

(56) References Cited

U.S. PATENT DOCUMENTS

| | | | |
|---|---|---|---|
| 9,990,044 B2* | 6/2018 | Needham | G06F 3/0304 |
| 11,024,193 B1* | 6/2021 | Saxton | G09B 7/06 |
| 2005/0063564 A1* | 3/2005 | Yamamoto | B60R 25/2045 |
| | | | 701/1 |
| 2009/0327977 A1 | 12/2009 | Bachfischer et al. | |
| 2011/0084707 A1* | 4/2011 | Nakayama | G01C 21/3664 |
| | | | 701/1 |
| 2014/0062858 A1* | 3/2014 | Yasumoto | G06F 3/0304 |
| | | | 345/156 |
| 2014/0172231 A1 | 6/2014 | Terada et al. | |
| 2015/0131857 A1 | 5/2015 | Han et al. | |
| 2015/0234536 A1 | 8/2015 | Yamashita et al. | |
| 2016/0103499 A1* | 4/2016 | Yamamoto | G06F 3/04883 |
| | | | 345/156 |
| 2017/0083777 A1* | 3/2017 | Arata | G06K 9/00832 |
| 2019/0392107 A1* | 12/2019 | Ricci | H05K 3/0005 |
| 2020/0331486 A1* | 10/2020 | Wieczorek | G06K 9/00845 |
| 2021/0255764 A1* | 8/2021 | Tanabe | G09G 5/14 |

FOREIGN PATENT DOCUMENTS

| | | |
|---|---|---|
| JP | 2011-169860 A | 9/2011 |
| JP | 2012-178161 A | 9/2012 |
| JP | 2014-119295 A | 6/2014 |
| JP | 2017-119508 A | 7/2017 |
| WO | 2014/073403 A1 | 5/2014 |

* cited by examiner

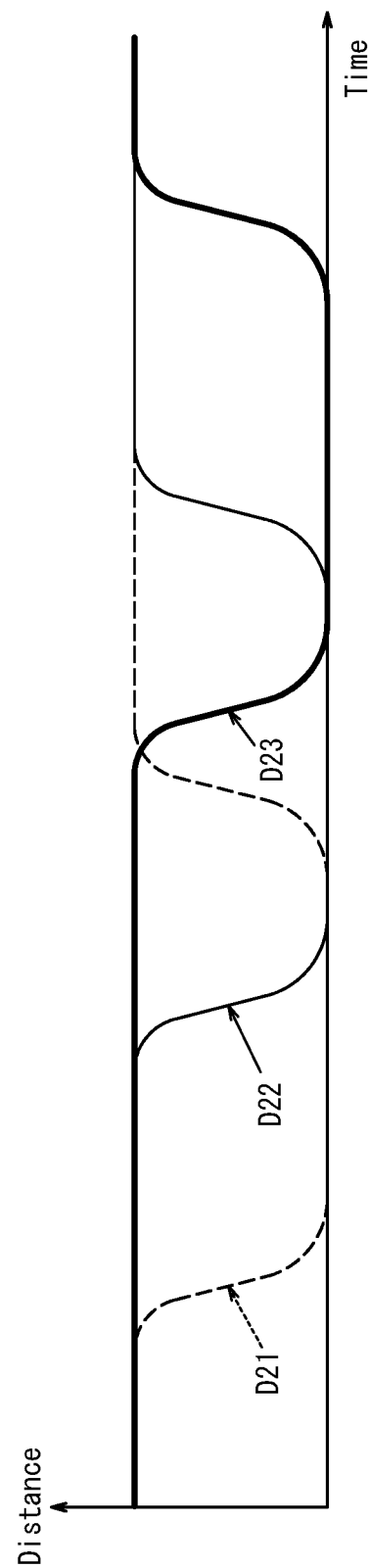

ELECTRONIC DEVICE, MOVING BODY, PROGRAM AND CONTROL METHOD

CROSS-REFERENCE TO RELATED APPLICATION

This application claims priority to and benefit of Japanese Patent Application No. 2018-024137 filed on Feb. 14, 2018, the entire contents of which are incorporated herein by reference.

TECHNICAL FIELD

This disclosure relates to an electronic device, a moving body, a program and a control method.

BACKGROUND

In the related art, there is known a device that assists a user in driving a vehicle. For example, Patent Literature 1 (PTL 1) discloses a vehicle-installed car navigation system, for example. The car navigation system disclosed in PTL 1 assists in driving a vehicle by displaying, for example, the information about the travel route to the destination and the like on a display.

CITATION LIST

Patent Literature

PTL 1: JP2011-169860A

SUMMARY

Solution to Problem

An electronic device according to an embodiment includes: a sensor configured to detect a gesture without touching an own device; and a controller configured to determine a hand of a user used for operation according to a driver's seat position and to determine a direction of the gesture based on an output from the sensor, according to the hand of the user used for operation.

A moving body according to the embodiment includes the electronic device.

The moving body according to the embodiment is communicably connected to the electronic device.

A program according to the embodiment causes an electronic device including a sensor configured to detect a gesture without touching an own device and a controller to execute the steps of: determining a hand of a user used for operation according to a driver's seat position; and determining a direction of the gesture based on an output from the sensor, according to the hand of the user used for operation.

A control method according to the embodiment is a control method performed by an electronic device including a sensor configured to detect a gesture without touching an own device and a controller, the method including the steps of: determining a hand of a user used for operation according to a driver's seat position; and determining a direction of the gesture based on an output from the sensor, according to the hand of the user used for operation.

BRIEF DESCRIPTION OF THE DRAWINGS

In the accompanying drawings:

FIG. 16 is a diagram schematically illustrating a change in distance to an object detected by each light receiving element.

DETAILED DESCRIPTION

In the related art, a user of car navigation system performs touch input on a display when performing an input operation. However, when the touch input is performed while driving a vehicle, it is difficult to ensure the safety of driving a vehicle. It is an object of this disclosure to provide an electronic device, a moving body, a program and a control method capable of improving the driving safety of a moving body. According to the electronic device, the moving body, the program and the control method of this disclosure, the driving safety of a moving body can be improved.

Electronic Device Configuration

Figure 1:
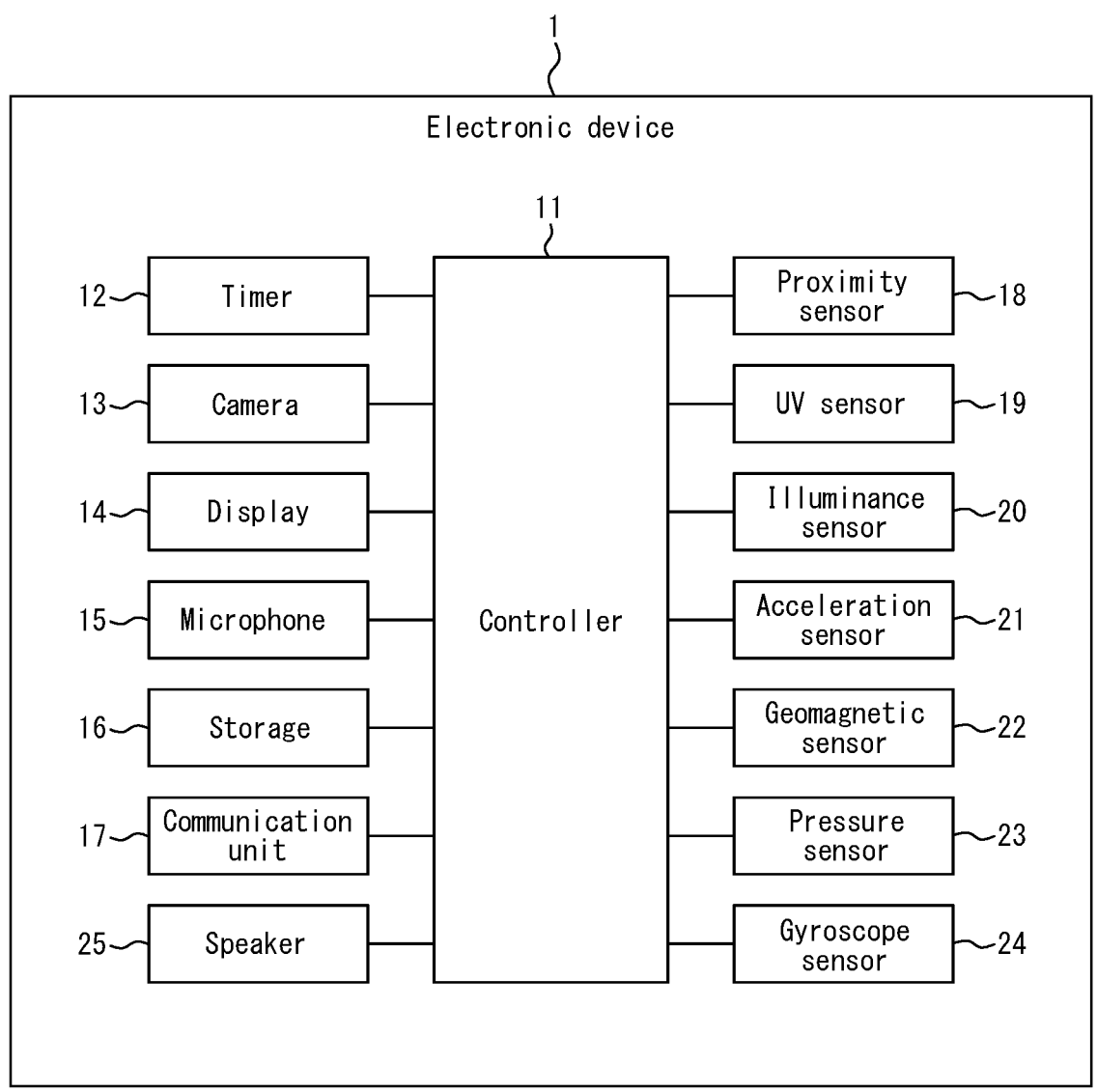
FIG. 1 is a schematic block diagram of an electronic device according to an embodiment.

As illustrated in FIG. 1, an electronic device 1 according to an embodiment includes a timer 12, a camera 13, a display 14, a microphone 15, a storage 16, a communication unit 17, a speaker 25, a proximity sensor 18 (gesture sensor) and a controller 11. The electronic device 1 further includes a UV sensor 19, an illuminance sensor 20, an acceleration sensor 21, a geomagnetic sensor 22, a pressure sensor 23 and a gyro sensor 24. FIG. 1 illustrates an example. The electronic device 1 may not include all of the components illustrated in FIG. 1. Further, the electronic device 1 may include components other than those illustrated in FIG. 1.

The electronic device 1 may be realized as a variety of devices used for driving or steering a moving body. The moving body may be configured by any movable device.

The user may get into the moving body. The moving body may include, for example, a vehicle, a ship and an aircraft. The vehicle may include, for example, an electric car, a hybrid electric car, a gasoline car, a motorcycle, a two wheel, a welfare vehicle and the like. The vehicle may include, for example, a rail vehicle. The moving body may be driven or steered by a user. At least a part of user operation relating to driving or steering of a moving body may be automated. The moving body may be movable autonomously, not by user operation. Description will be given herein assuming that the moving body is a car driven by a user.

When the moving body is a car, the electronic device 1 may be realized as an in-vehicle device such as a car navigation system installed in a car, for example. The electronic device 1 may be realized, for example, as a mobile phone terminal, a phablet, a tablet personal computer (PC), a smart phone, a feature phone, or the like. In this case, the electronic device 1 may be communicably connected wired or wirelessly to the system installed in a car driven by a user. For example, the electronic device 1 may be realized as a smart phone, and may be communicably connected to a system installed in a car over Bluetooth®. The electronic device 1 is not limited to the above examples, and may be realized as any device used in driving or steering a moving body. The electronic device 1 may be realized, for example, as a Personal Digital Assistant (PDA), a remote controller terminal, a mobile music player, a game machine, an e-book reader, household appliances or industrial equipment (FA equipment) and the like. Here an explanation is given assuming that the electronic device 1 is realized as a car navigation system installed in a car.

The timer 12 receives an instruction of timer operation from the controller 11 and outputs, after a predetermined time, a signal indicating so to the controller 11. As illustrated in FIG. 1, the timer 12 may be provided independently from the controller 11 or may be configured to be built in the controller 11.

The camera 13 takes an image of an object around the electronic device 1. As an example, the camera 13 is provided on a surface of the electronic device 1 where the display 14 is provided.

The display 14 displays a screen. The screen includes at least one of characters, images, symbols, figures and the like. The display 14 may be a Liquid Crystal Display, an Organic Electro-Luminescence (EL) Panel, an Inorganic Electro-Luminescence Panel or the like. In this embodiment, the display 14 is a touch panel display (touch screen display). The touch panel display detects a touch of a finger, a stylus pen and the like and determines the touched position. The display 14 can simultaneously detect a plurality of positions touched by a finger, a stylus pen and the like.

The microphone 15 detects sound, including human voice, around the electronic device 1.

The storage 16 serves as a memory and stores programs and data. The storage 16 temporarily stores the processing results of the controller 11. The storage 16 may include any storage device such as a semiconductor storage device or a magnetic storage device. The storage 16 may include some kinds of storage devices. The storage 16 may include a combination of a portable storage medium such as a memory card and a reader of the storage medium.

Programs stored in the storage 16 include applications performed in foreground or background and control programs that support operation of applications. An application causes the controller 11 to perform processing in response to a gesture, for example. The control program is an operating system (OS), for example. Applications and control programs may be installed in the storage 16 via communication by the communication unit 17 or via a storage medium.

The communication unit 17 is an interface for wired or wireless communications. The communication method performed by the communication unit 17 according to the embodiment is a wireless communication standard. For example, the wireless communication standard includes cellular phone communication standards such as 2G, 3G and 4G. Cellular phone communication standards include, for example, Long Term Evolution (LTE), Wideband Code Division Multiple Access (W-CDMA), CDMA2000, Personal Digital Cellular (PDC), Global System for Mobile communications (GSM®), Personal Handy-phone System (PHS) and the like. Wireless communication standards include, for example, Worldwide Interoperability for Microwave Access (WiMAX), IEEE802.11, Bluetooth®, Infrared Data Association (IrDA), Near Field Communication (NFC), and the like. The communication unit 17 can support one or more of the above described communication standards.

The speaker 25 outputs sound. The speaker outputs, for example, a voice that guides the input route of the car to the destination. When the electronic device 1 is realized as a device capable of making a call, the voice of the other party is output from the speaker 25 during a call. Further, when news or weather forecast is read out, the content thereof is output from the speaker 25 as sound.

The proximity sensor 18 contactlessly detects a distance relative to an object around the electronic device 1 and the moving direction of the object, and the like. In this embodiment, the proximity sensor 18 has one infrared light emitting diode (LED) for light source and four infrared photodiodes. The proximity sensor 18 irradiates infrared light from the infrared LED for light source to the object. In the proximity sensor 18, the light reflected from the object is the incident light to the infrared photodiodes. The proximity sensor 18 can then measure the distance relative to the object based on the output current from the infrared photodiodes. Further, the proximity sensor 18 detects the moving direction of the object based on the difference between the times at which light reflected from the object enters each of the infrared photodiodes. Therefore, the proximity sensor 18 can detect an operation using an air gesture (hereinafter referred merely as a "gesture") by the user of the electronic device 1 made without touching the electronic device 1. Here, the proximity sensor 18 may have visible light photodiodes.

The controller 11 is a processor such as a Central Processing Unit (CPU), for example. The controller 11 may also be an integrated circuit such as a System-on-a-Chip (SoC) in which other components are integrated. The controller 11 may be configured by combining a plurality of integrated circuits. The controller 11 controls overall operation of the electronic device 1 to realize a variety of functions.

When the electronic device 1 is realized as a car navigation system installed in a car, the controller 11 included in the electronic device 1 may be configured as an Electric Control Unit or an Engine Control Unit (ECU) installed in a car, for example.

Specifically, the controller 11 refers to data stored in the storage 16 as needed. The controller 11 realizes a variety of functions by executing instructions included in program stored in the storage 16 to control the other functional units such as the display 14. For example, the controller 11 obtains data of contact by the user from a touch panel. For example, the controller 11 obtains information related to a gesture made by the user, which is detected by the proximity sensor 18. For example, the controller 11 grasps the starting state of an application, for example.

The UV sensor 19 can measure the amount of ultraviolet rays contained in the sunlight and the like.

The illuminance sensor 20 detects the illuminance of ambient light incident on the illuminance sensor 20.

The acceleration sensor 21 detects the direction and the size of acceleration acting on the electronic device 1. The acceleration sensor 21 is a triaxial (3D) type acceleration sensor that detects acceleration in x-axial, y-axial and z-axial directions, for example. The acceleration sensor 21 may be a piezoresistive type or a capacitance type acceleration sensor, for example.

The geomagnetic sensor 22 detects the direction of geomagnetism to allow for measurement of the direction of the electronic device 1.

The pressure sensor 23 detects the pressure (atmospheric pressure) outside of the electronic device 1.

The gyro sensor 24 detects the angular velocity of the electronic device 1. The controller 11 can measure the change in the orientation of the electronic device 1 through time integration of the angular velocity obtained by the gyro sensor 24.

Operation of Electronic Device with Gestures

Figure 2:
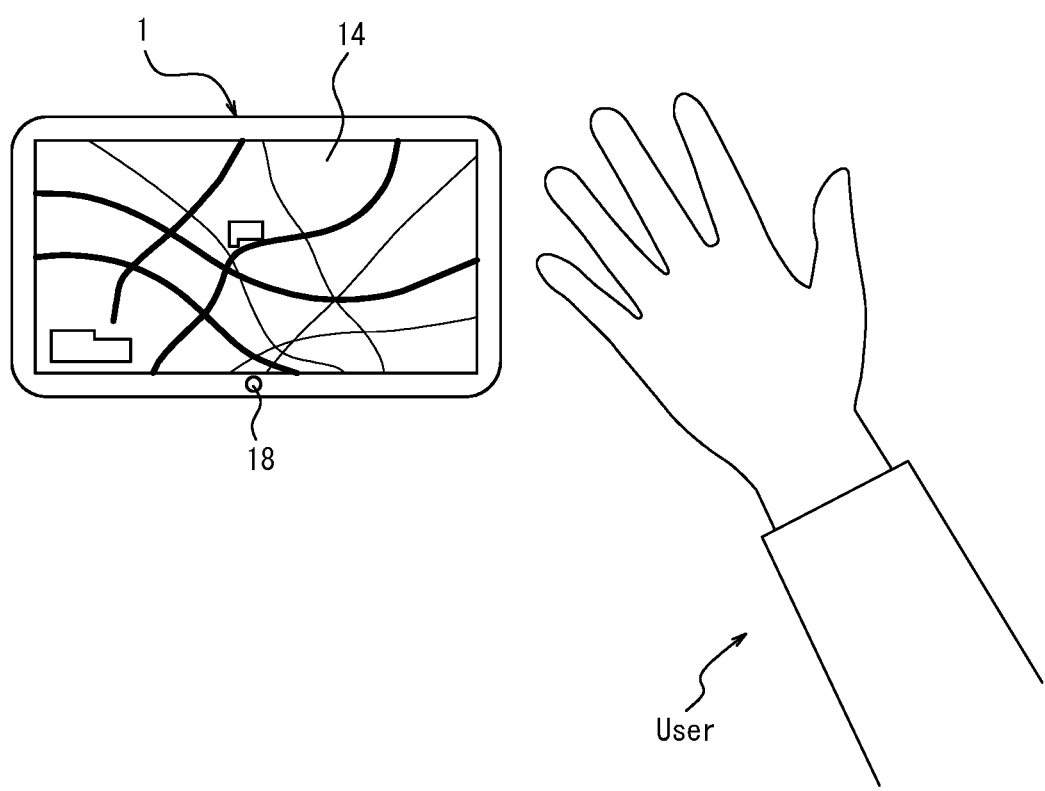
FIG. 2 is a diagram illustrating a state where a user operates an electronic device with a gesture.

FIG. 2 illustrates a state where the user operates the electronic device 1 with gestures. In FIG. 2, as an example, the display 14 of the electronic device 1 is provided on the console panel of the car, for example. Alternatively, the electronic device 1 may be supported by a supporting tool, provided in the car, to support the electronic device 1. When the proximity sensor 18 detects a user's gesture, the controller 11 performs processing based on the gesture detected. In the example illustrated in FIG. 2, the processing based on a gesture is, for example, an adjustment of volume of the sound output from the speaker 25. For example, when the user makes a gesture of moving his/her hand upward in the lateral direction of the electronic device 1, the volume increases as the user's hand moves. Further, when the user makes a gesture of moving his/her hand downward in the lateral direction of the electronic device 1, the volume decreases as the user's hand moves.

The processing based on a gesture is not limited to volume adjustment. The processing based on a gesture may be other processing that can be performed based on a gesture detected. For example, the processing based on a gesture may include enlargement or reduction in the information displayed on the display 14, adjustment of the brightness of the display on the display 14, start of reading of predetermined information by voice and stop of the reading by voice, and the like.

Gesture Detection Method

Figure 3:
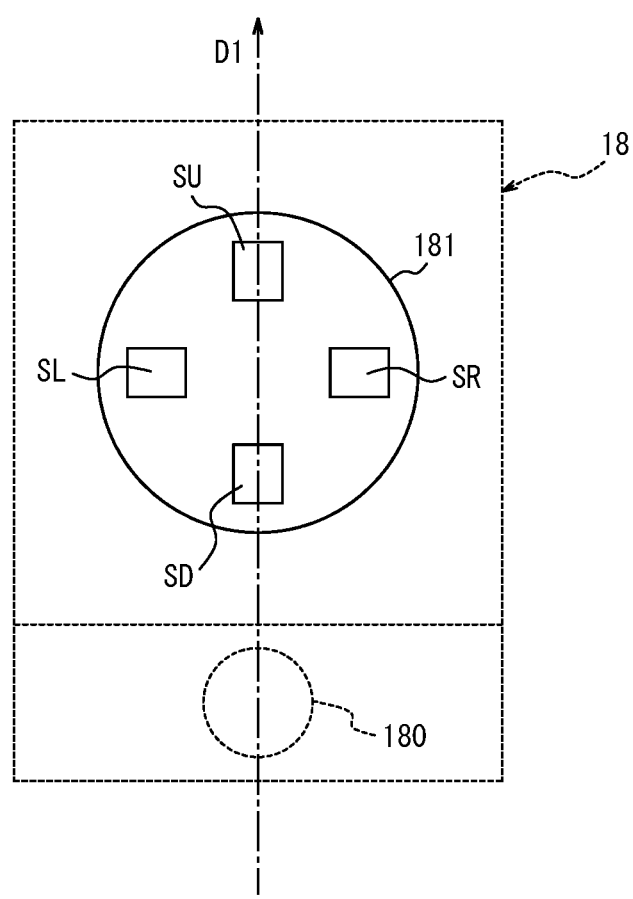
FIG. 3 is a schematic block diagram of a proximity sensor.

Here, a method in which the controller 11 detects a user's gesture based on output from the proximity sensor 18 will be described with reference to FIGS. 3 and 4. FIG. 3 is a diagram illustrating a configuration example of the proximity sensor 18 when the electronic device 1 is viewed from the front. The proximity sensor 18 has an infrared LED for light source 180 and four infrared photodiodes, SU, SR, SD and SL. The four infrared photodiodes, SU, SR, SD and SL detect the light reflected from an object to be detected through a lens 181. The four infrared photodiodes, SU, SR, SD and SL are symmetrically disposed about the center of the lens 181. Here, assuming that the virtual line D1 illustrated in FIG. 3 is approximately parallel to the longitudinal direction of the electronic device 1. The infrared photodiodes SU and SD are disposed separately on the virtual line D1 in FIG. 3. Further, the infrared photodiodes SR and SL are disposed between the infrared photodiodes SU and SD in the direction of the virtual line D1 in FIG. 3.

Figure 4:
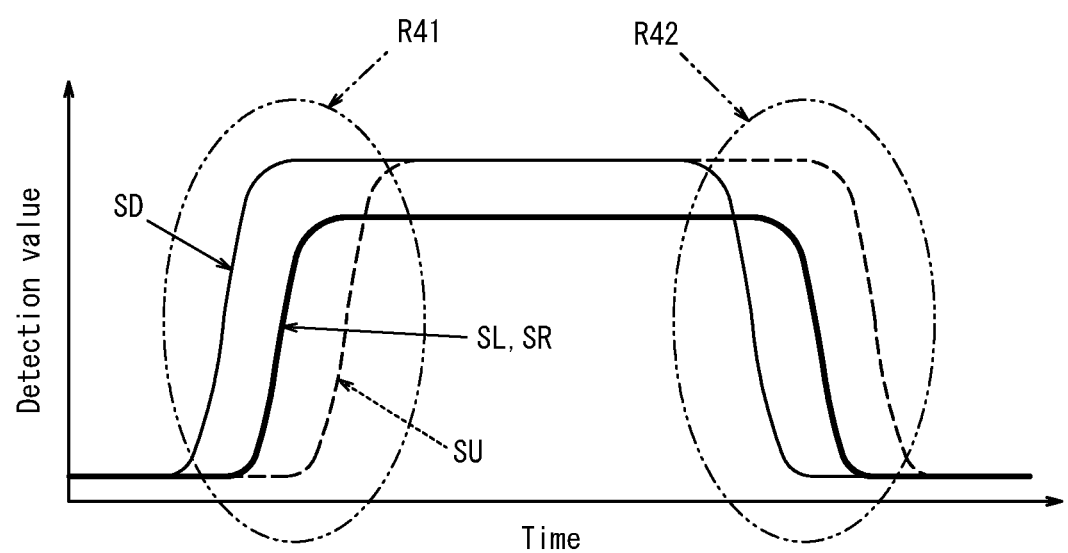
FIG. 4 is a diagram illustrating a change in detection values detected by each infrared photodiode.

FIG. 4 illustrates changes in detection values when the object to be detected (e.g. a user's hand and the like) by the four infrared photodiodes, SU, SR, SD and SL, moves along the direction of the virtual line D1 in FIG. 3. Here, the distance between the infrared photodiodes SU and SD is the largest in the direction of the virtual line D1. Thus, as illustrated in FIG. 4, the time difference between the change (e.g. an increase) in the detection value of the infrared photodiode SU (dashed line) and the change (e.g. an increase) in the detection value of the infrared photodiode SD (thin solid line) is the largest. The controller 11 can determine the moving direction of the object to be detected by grasping the time difference of a predetermined change in the detection values of the photodiodes SU, SR, SD and SL.

The controller 11 obtains detection values of the photodiodes SU, SR, SD and SL from the proximity sensor 18. The controller 11 may then integrate a value obtained by subtracting a detection value of the photodiode SU from a detection value of the photodiode SD over a predetermined time to grasp the movement of the object to be detected in the direction of the virtual line D1. In the example illustrated in FIG. 4, the integrated value is nonzero in regions R41 and R42. The controller 11 can grasp the movement of the object to be detected in the direction of the virtual line D1 based on this change in the integrated value (e.g. a change of positive value, zero and negative value).

The controller 11 may also integrate a value obtained by subtracting the detection value of the photodiode SR from the detection value of the photodiode SL over a predetermined time. The controller 11 can grasp the movement of the object to be detected in the direction orthogonal to the virtual line D1 (e.g. the direction approximately parallel to the longitudinal direction of the electronic device 1 illustrated in FIG. 2, for example) based on the change in the integrated value (e.g. a change of positive value, zero and negative value).

Alternatively, the controller 11 may perform an operation by using all detection values of the photodiodes SU, SR, SD and SL. That is, the controller 11 may grasp the moving direction of the object to be detected without separating into longitudinal and lateral components of the electronic device 1 for operation.

Gestures to be detected include, for example, a side-to-side gesture, an up-and-down gesture, a diagonal gesture, a gesture forming a circle in a clockwise manner and a gesture forming a circle in a counterclockwise manner. For example, the side-to-side gesture is a gesture made in the direction approximately parallel to the longitudinal direction of the electronic device 1. The up-and-down gesture is a gesture performed in the direction approximately parallel to the lateral direction of the electronic device 1. The diagonal gesture is a gesture performed in a direction which is parallel to neither the longitudinal direction nor the lateral direction of the electronic device 1 on a plane approximately parallel to the front of the electronic device 1.

Car Mode

Figure 5:
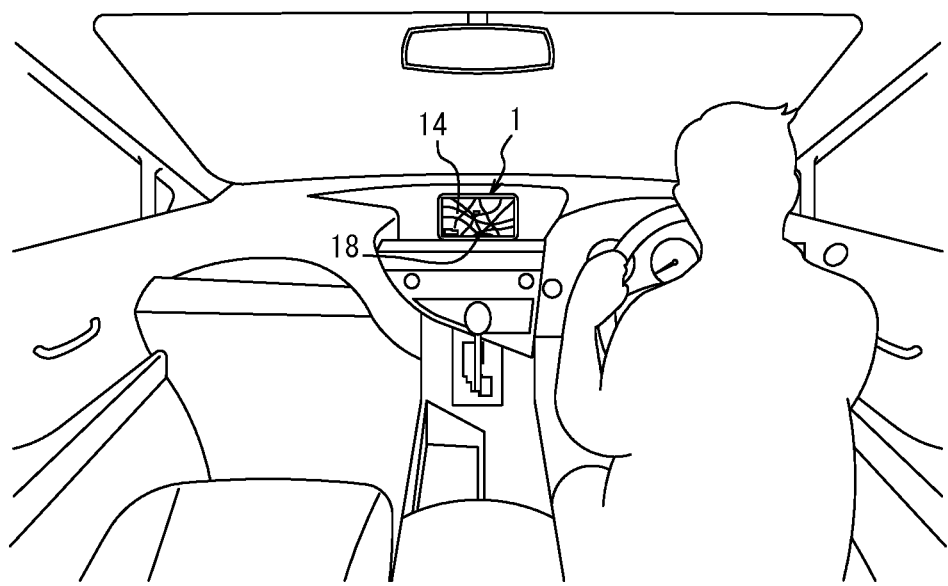
FIG. 5 is a diagram illustrating a state where the user operates the electronic device with a gesture.

FIG. 5 illustrates an example of a state where the user operates the electronic device 1 with gestures. As illustrated in FIG. 5, for example, the electronic device 1 is disposed such that the display 14 is centered in the console panel of the car. In the example illustrated in FIG. 5, the user gets into a car installed with the electronic device 1 and drives the car while displaying a route to the destination on the display 14 of the electronic device 1 and referring to the route displayed. At this time, the proximity sensor 18 is in a state where it can detect a user's gesture. The controller 11 performs processing based on a gesture detected by the proximity sensor 18.

For example, the controller 11 can perform processing of adjusting the volume of the sound output from the electronic device 1 in response to a specific gesture (e.g. a user' gesture to move his/her hand up and down). The electronic device 1 can accept a touch input from the user on a touch screen display. However, if the user tries to perform touch input while driving, he/she may make a mistake in operating a steering when reaching for the touch screen display. Further, when the user transfers his/her gaze to the display 14 to confirm the position of touch input on the display while driving, the confirmation of the surrounding situation may be neglected. In this case, the driving safety of the car may be reduced. On the other hand, as with this embodiment, when the electronic device 1 can accept input operation by gestures, the user can perform input operation without touching the electronic device 1. In this manner, the driving safety can be easily secured even if the user performs input operation while driving.

Here, the electronic device 1 may have a plurality of modes. A mode refers to an operating mode (operating condition or state) that limits the overall operation of the electronic device 1. Only one mode can be selected simultaneously. In this embodiment, the modes of the electronic device 1 include a first mode and a second mode. The first mode is a normal operating mode (normal mode) suitable for use in states other than driving, for example. The states other than driving may include any one of the states where, for example, the car engine is not running, the shift lever is in a predetermined range (e.g. a parking range), a brake is pressed and a route to the destination is not displayed. The second mode is an operating mode (car mode) of the electronic device 1 suitable for driving a car by displaying a route to the destination on the display 14 of the electronic device 1. As described above, in the case of the second mode, it is preferable that input with gestures is possible. That is, when the mode of the electronic device 1 is switched to the second mode, it is preferable to operate the proximity sensor 18 in conjunction therewith to enable gesture detection. The electronic device 1 may switch the mode of the electronic device 1 based on a predetermined input operation to the electronic device 1 or a predetermined input operation to the car by the user.

Method of Determining Gesture Direction

Next, processing of determining a gesture direction by the controller 11 of the electronic device 1 will be described. The processing of determining a gesture direction by the controller 11 may be performed, for example, when the electronic device 1 is in the above described car mode.

In the electronic device 1, the direction detected as a gesture may be determined in advance. For example, the direction detected as a gesture may be determined to the vertical direction and the horizontal direction. In this embodiment, in order to simplify the explanation, explanation is given below assuming that, in the electronic device 1, the direction detected as a gesture is determined in the vertical direction and the horizontal direction. That is, in this embodiment, a gesture in the diagonal direction is not considered, which, however, does not limit the direction detected as a gesture in the electronic device 1 according to this disclosure. Therefore, the electronic device 1 may detect a gesture in the diagonal direction in the same manner as described below.

If the direction detected as a gesture in the electronic device 1 is determined to the vertical direction and the horizontal direction, when the controller 11 of the electronic device 1 detects a gesture, it determines whether the detected gesture is the vertical direction or the horizontal direction. For example, the controller 11 can determined if the detected gesture is the vertical operation or the horizontal operation. For example, when detecting a gesture, the controller 11 breaks down the gesture into the vertical component (moving amount) and the horizontal component (moving amount). The controller 11 then determines that the gesture is the vertical gesture when the vertical component is larger than the horizontal component. On the other hand, the controller 11 determines that the gesture is the horizontal gesture when the horizontal component is larger than the vertical component.

The controller 11 determines the gesture direction using a determination criterion, for example. The determination criterion is a criterion for determining the direction of the gesture, and may be stored in advance in the storage 16.

Figure 6:
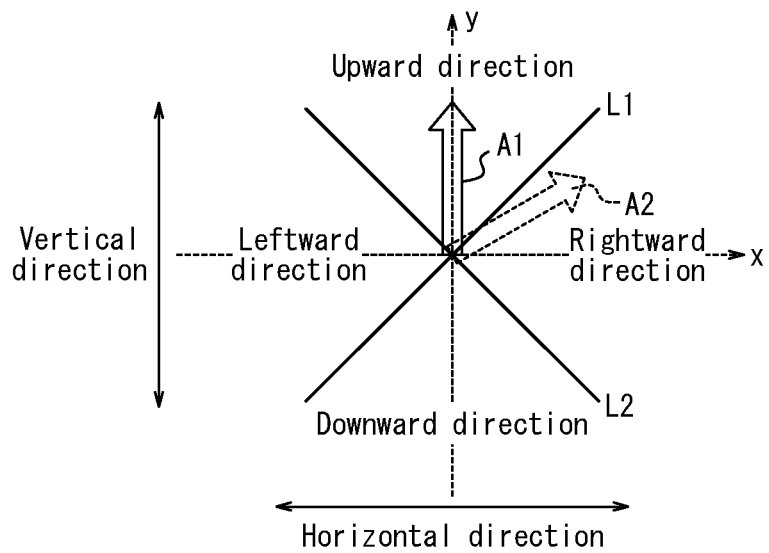
FIG. 6 is a conceptual diagram for illustrating determination of a gesture direction.

FIG. 6 is a conceptual diagram for explaining a method for determining a direction of a gesture using a determination criterion. In FIG. 6, a rectangular coordinate system is set, and x-axis and y-axis are associated with the horizontal direction and the vertical direction, respectively. As illustrated as an example in FIG. 6, the determination criterion includes two straight lines L1 and L2. Hereinafter, when referring to an angle, the x-axis positive direction is a reference (0 degree) and the counterclockwise is a positive direction of angle. Therefore, the y-axis positive direction is 90 degrees.

In the determination criterion illustrated in FIG. 6, the straight line L1 is set to 45 degrees and the straight line L2 is set to −45 degrees (i.e. 315 degrees). That is, in the determination criterion illustrated in FIG. 6, the straight line L1 and the straight line L2 are orthogonal to each other. Four regions divided by the straight line L1 and the straight line L2 are associated with the up direction, the down direction, the right direction and the left direction, respectively. Specifically, with respect to the four regions divided by the two straight lines L1 and L2, the region from −45 to 45 degrees, the region from 45 to 135 degrees, the region from 135 to 225 degrees and the region from 225 to 315 degrees are associated with the right direction, the up direction, the left direction and the down direction, respectively. The determination criterion illustrated in FIG. 6 is hereinafter also referred to as the "standard determination criterion."

The controller 11 calculates the direction of the vector indicated by the gesture based on the output (detection value) from the proximity sensor 18, and determines, using the determination criterion, the direction indicated by the calculated vector. For example, when the vector of the gesture calculated based on the output from proximity sensor 18 is oriented 90 degrees as indicated by the arrow A1 in FIG. 6, the controller 11 can determine that the gesture is an upward gesture, using the standard determination criterion illustrated in FIG. 6. Further, for example, when the vector of the gesture calculated based on the output from the proximity sensor 18 is oriented 30 degrees as indicated by the arrow A2 in FIG. 6, the controller 11 can determine that the gesture is a rightward gesture, using the standard determination criterion illustrated in FIG. 6.

Figure 7:
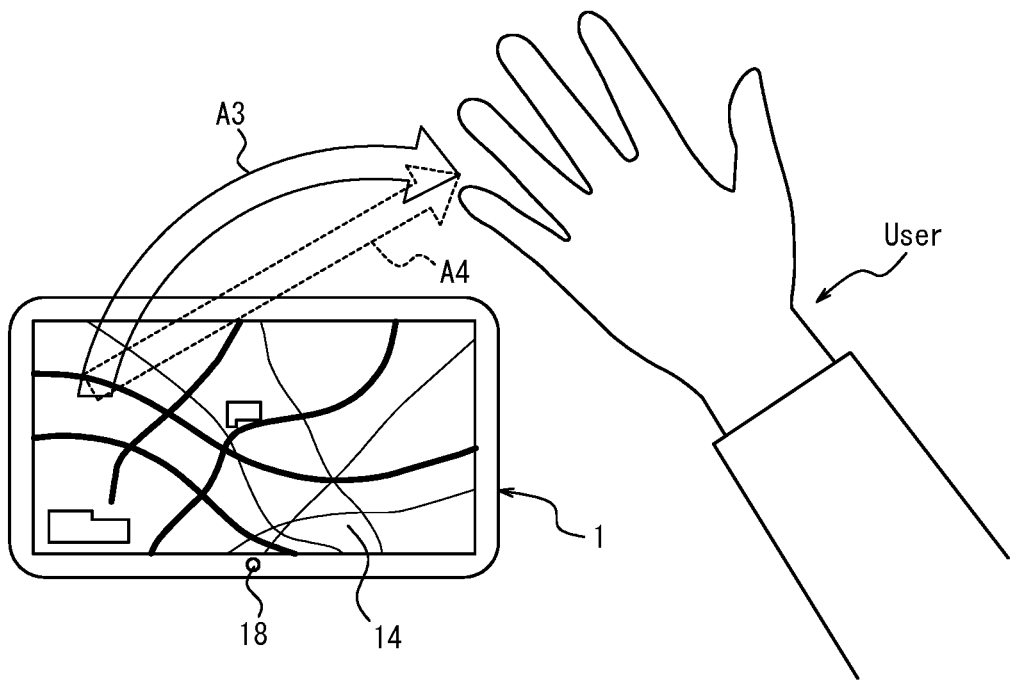
FIG. 7 is a diagram schematically illustrating an example of a user's gesture.

When the direction of the gesture is determined using the standard determination criterion, a user's gesture may not be determined as a gesture in the direction intended by the user. For example, as illustrated in FIG. 5, assuming that, in the car, the display 14 and the proximity sensor 18 are disposed in the center of the console panel and the driver's seat is disposed on the right side in the traveling direction, and, for example, when the user sitting in the driver's seat performs an input with a gesture, he/she makes a gesture of moving his/her hand from downward to upward with the intention of performing the upward operation. In the car, the driver's seat is disposed on the right side in the traveling direction and the proximity sensor 18 is disposed at the center. Thus, when the user sitting in the driver's seat performs an input with a gesture, it is natural for the user to make a gesture with his/her left hand. At this time, due to the structure of the human body, the palm of the left hand moves in an arc with the elbow or shoulder of the left hand as an axis, as schematically indicated by the arrow A3 in FIG. 7. In this case, the gesture made by the user has an upward component intended by the user and a rightward component caused by the arc drawn by the palm.

When the gesture schematically indicated by the arrow A3 is made, the controller 11 calculates the direction of the vector indicated by the gesture based on the output from the proximity sensor 18 that detects the gesture. Specifically, the controller 11 calculates the sizes of the upward component and the rightward component based on the output from the proximity sensor 18, and calculates the direction of the vector indicated by the gesture (i.e. the direction schematically indicated by the arrow A4 in FIG. 7), based on the sizes of the upward component and the rightward component. The controller 11 determines the direction of the gesture using the determination criterion, based on the direction of the vector calculated.

In the gesture schematically indicated by the arrow A3, when the rightward component is larger than the upward component, the direction of the vector indicated by the gesture is less than 45 degrees. In this case, when the controller 11 determines the direction of the vector indicated by the gesture using the standard determination criterion, the gesture is determined to be a rightward gesture. However, in the above gesture, the gesture intended by the user is an upward operation. Thus, when the controller 11 determines that the gesture is a rightward gesture and performs rightward processing, an erroneous operation occurs.

The controller 11 of the electronic device 1 according to this embodiment determines a hand of the user used for operating an own device (electronic device 1) according to the driver's seat position, and according to the determined hand of the user used for operation, determines the direction of the user's gesture. In this manner, the above described erroneous operation can be prevented easily. Specifically, the controller 11 of the electronic device 1 according to this embodiment determines the driver's seat position in the car installed with the electronic device 1, and determines a hand of the user used for operating an own device according to the determined driver's seat position. Furthermore, the controller 11 of the electronic device 1 determines the determination criterion for determining the direction of the gesture according to the determined hand used for operating the own device, and determines the direction of the gesture using the determined determination criterion. In this manner, the electronic device 1 can prevent erroneous operation easily.

Control performed by the controller 11 of the electronic device 1 according to this embodiment will be described in detail below.

Method of Determining Driver's Seat Position

Figure 8:
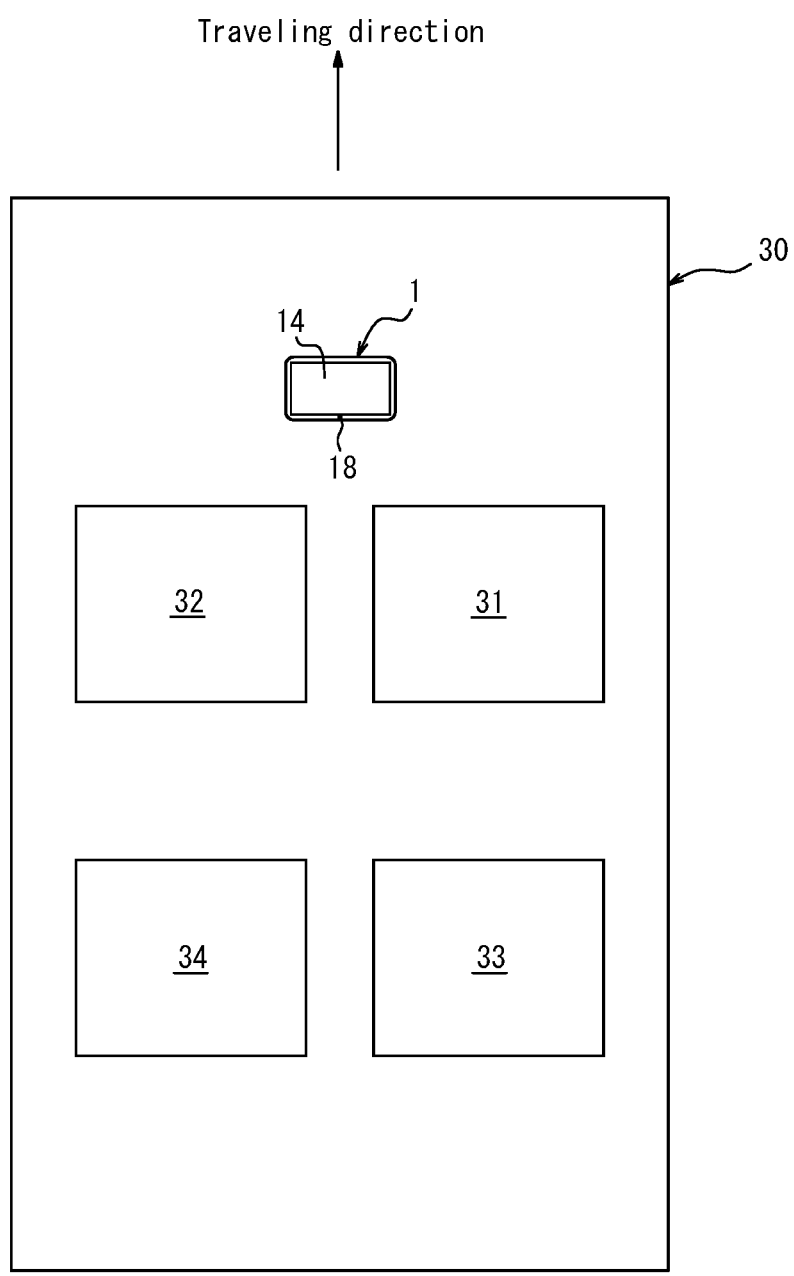
FIG. 8 is a diagram illustrating an example of seat layout in a car.

The controller 11 determines a driver's seat position in the car installed with the electronic device 1. For example, as illustrated in FIG. 8, the car 30 has two seats in each of the front row and the rear row in the traveling direction, and two seats on each of the right side and the left side. That is, the car 30 has seats 31, 32, 33 and 34 on the right side of the front row on, on the left side of the front row, on the right side of the rear row and the left side of the rear row, respectively. Further, in the car 30, the display 14 and the proximity sensor 18 are disposed in the center on the front side of the front row. The controller 11 determines which of the seats from 31 to 34 is a driver's seat in the car 30 illustrated in FIG. 8, for example. The controller 11 can determine the driver's seat position by using one of the methods or by combining two or more methods described herein.

It is to be noted that the driver's seat is a seat in which a driver who drives the car 30 sits. When the car 30 has a steering and the user operates the steering to drive, the driver's seat is a seat in front of the position where the steering is disposed. Normally, the steering of the car 30 is disposed in front of either one of the seats in the front row, and therefore the seat 31 on the right side of the front row or the seat 32 on the left side of the front row is determined as a driver's seat position.

For example, the controller 11 may determine in advance the driver's seat position based on the information stored in the storage 16 in advance. For example, when the electronic device 1 is installed in the car 30 in advance, the information on the driver's seat position may be stored in the storage 16. Alternatively, when the user inputs the information on the driver's seat position by performing input operation to the electronic device 1, the information on the driver's seat position may be stored in the storage 16. In this case, the controller 11 can determine the driver's seat position based on the information on the driver's seat position stored in the storage 16.

For example, the controller 11 may determine the driver's seat position based on an image taken by the camera 13. Specifically, the controller 11 activates the camera 13 when performing control based on a gesture (e.g. when the electronic device 1 is in a first operating mode). The camera 13 takes an image of the front side of the display 14, that is, inside of the car 30. The controller 11 may analyze the image taken by the camera 13 and determine the position of the seat in front of the steering as a driver's seat position. The controller 11 analyzes the image taken by the camera 13, and if the user is seen in the seat in front of the steering in the image, the controller 11 may determine the position of the seat as the driver's seat position. When determining the driver's seat position, the controller 11 may stop operating the camera 13. In this manner, the controller 11 can reduce the power consumption of the camera 13.

For example, when each of the seats from 31 to 34 is provided with a pressure sensor, the controller 11 may determine the driver's seat position based on the output of the pressure sensors. The pressure sensor may be provided below a seating surface of each of seats 31 to 34 to which a load is applied when the user sits therein. The pressure sensor detects a pressure applied to the seating surface of each of the seats 31 to 34. When the user gets in the car and sits in the seat, the controller 11 can determine the seat in which the user sits based on the output from the pressure sensor disposed at the seat. The controller 11 may determine the position of the seat in which the user sits as a position of the driver's seat. This method can be used, for example, when only one user gets in the car.

For example, the controller 11 may determine the driver's seat position based on the direction in which the gesture is first detected after power is supplied to the electronic device 1. After power is supplied to the electronic device 1 by turning on the electronic device 1 or by starting the engine to use the electronic device 1, the user puts his/her hand closer to the electronic device 1 to operate it. In this case, the user extends his/her hand from the direction of the seat in which the user sits. That is, when the user sits on the right side in the traveling direction, the user's hand extends from the right side of the proximity sensor 18 in the traveling direction. On the other hand, when the user sits on the left side in the traveling direction, the user's hand extends from the left side of the proximity sensor 18 in the traveling direction. In this manner, the electronic device 1 can determine that the user exists in the direction in which the gesture is first detected by the proximity sensor 18. The user who tries to operate the electronic device 1 when driving the car 30 is usually considered to be a user who drives the car 30. Thus the controller 11 can determine that the driver's seat is positioned in the direction in which the gesture is first detected.

For example, when a human detection sensor is provided in front of each of the seats from 31 to 34, the controller 11 may determine the driver's seat position based on the output from the human detection sensor. The human detection sensor may detect whether the user sits in one of the seats from 31 to 34 or not by detecting a change in the ambient temperature using infrared rays, for example. When the user gets in the car and sits in a seat, the controller 11 can determine the seat in which the user sits based on the output from the human detection sensor disposed in front of the seat. The controller 11 may determine the position of the seat in which the user sits as a driver's seat position. This method can be used when only one user gets in the car, for example.

For example, the controller 11 may determine the driver's seat position based on opening and closing of the door of the car 30. For example, the car 30 is assumed to have a door near each of the seats from 31 to 34. Specifically, the car 30 is assumed to have a door on each of the right side of the seat 31 on the right side of the front row, the left side of the seat 32 on the left side of the front row, the right side of the seat 33 on the right side of the rear row and the left side of the seat 34 on the left side of the rear row. Further, each door is assumed to be provided with a sensor configured to detect opening and closing. The controller 11 can determine that the user sits in the seat closest to the door that is opened/closed. This is because it is considered that the user usually gets in the car 30 from the door closest to the seat in which the user intends to sit. The controller 11 may determine the position of the seat determined as the seat in which the user sits as a driver's seat position. This method can be used when only one user gets in the car, for example.

For example, the controller 11 may determine the driver's seat position based on the position at which the door of the car 30 is unlocked. When a plurality of doors are provided to the car 30 as described above, the controller 11 can determine that the user sits in the seat closest to the door to which unlock operation is performed. This is because it is considered that the user unlocks the door closest to the seat in which the user intends to sit and gets in the car 30 from the door. The controller 11 may determine the position of the seat determined in which the user is going to sit as a driver's seat position. This method can be used when only one user gets in the car, for example.

For example, the controller 11 may determine the driver's seat position based on the hand used for operating the touch screen display. For example, the user stores in advance the fingerprint data of right and left fingers in the storage 16 of the electronic device 1. For example, the user performs input operation for registering the fingerprint data to store the fingerprint data in the storage 16 of the electronic device 1. When the user's finger touches the touch screen display in a state where the power is supplied to the electronic device 1 to drive the car 30, the controller 11 reads a fingerprint of the finger that touches the touch screen display to determine whether the finger is the right hand finger or the left hand finger of the user. The controller 11 determines that the seat on the opposite side of the direction of the hand determined (i.e. a right hand or a left hand) is a seat in which the user sits. For example, when the user sits in the seat on the right side, it is assumed that the user performs touch input with his/her left hand to the touch screen display disposed in the center. Thus, when determining that the finger that touches the touch screen display is the user's left hand, the controller 11 determines that the user sits in the seat on the right side. On the contrary, when the user sits in the seat on the left side, it is assumed that the user performs touch operation to the touch screen display disposed at the center with his/her right hand. Thus, when determining that the finger that touches the touch screen display is the user's right hand, the controller 11 determines that the user sits in the seat on the left side. The controller 11 may determine the position of the seat in which the user is determined to be sitting as a driver's seat position.

For example, the controller 11 may determine the driver's seat position based on the sound detected by the microphone 15. For example, the controller 11 determines the direction from which the sound is generated based on the sound detected by the microphone 15. The controller 11 can determine that the direction from which the determined sound is generated as the direction in which the user exists. Thus the controller 11 may determine the position of the seat that exists in the direction from which the sound is generated as a driver's seat position.

Method of Determining Hand Used for Operating Own Device

The controller 11 determines a hand of a user used for operating an own device based on the driver's seat position. The hand of a user used for operating an own device may be a hand of a user used for making a gesture for operating the own device. For example, when the user makes a gesture with his/her right hand to operate the own device with a gesture, the hand used for operating the own device means his/her right hand. On the contrary, when the user makes a gesture with his/her left hand, the hand used for operating the own device means his/her left hand.

The controller 11 may determine, for example, the hand on the side opposite to the driver's seat position determined as above as a hand of the user used for operating the own device. That is, when determining that the driver's seat position is located on the right side in the traveling direction, for example, the controller 11 may determine the left hand as a hand used for operating the own device. Similarly, when determining that the driver's seat position is located on the left side in the traveling direction, for example, the controller 11 may determine the right hand as a hand used for operating the own device. When the proximity sensor 18 of the electronic device 1 is disposed in the center of the console panel, for example, the controller 11 can accurately determine the hand of the user used for operating the electronic device 1 easily by determining a hand used for operating the own device as described above.

It is to be noted that the controller 11 may determine, depending on the position of the proximity sensor 18 in the car, the hand used for operating the own device with a method different from that described above. The controller 11 may determine the hand of the user, who sits in the driver's seat, that is more likely to be used for performing gesture operation as a hand of the user used for operating the own device, according to the positional relationship between the proximity sensor 18 and the driver's seat. The controller 11 may, for example, determine the hand closer to the proximity sensor 18 as a hand used for operating the own device.

Method of Determining Gesture Based on Determination Criterion

The controller 11 determines the determination criterion according to a hand of the user used for operating the own device determined as described above, for example. That is, the controller 11 determines, in a state where the hand of the user used for making a gesture is determined, the determination criterion according to the hand for making a gesture.

When the hand used for making a gesture is a left hand, the controller 11 uses a left hand determination criterion to determine the direction of the gesture. The left hand determination criterion is a determination criterion that facilitates determination of the direction of the gesture according to the intention of the user when operation is performed with a left hand, in consideration of the nature of movement with a left hand. The nature of movement with a left hand includes, as described with reference to FIG. 7, a nature that the rightward component is likely to be included with respect to the upward operation, for example. The nature of movement with a left hand includes, for example, a nature that the leftward component is likely to be included with respect to the downward operation, for the same reason as described with reference to FIG. 7.

Figure 9:
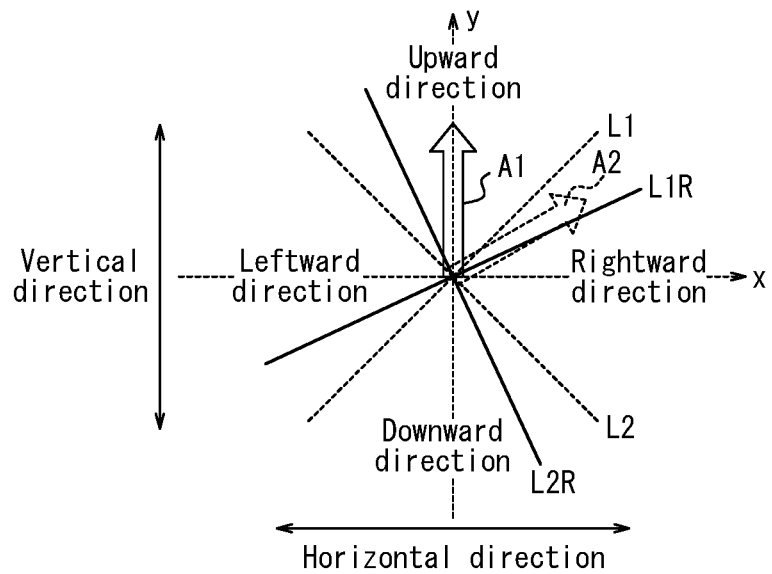
FIG. 9 is a diagram illustrating an example of a left hand determination criterion.

FIG. 9 is a diagram illustrating an example of a left hand determination criterion. As illustrated in FIG. 9 as an example, the left hand determination criterion includes two straight lines L1R and L2R. The straight lines L1R and L2R are obtained, respectively, by rotating the straight lines L1 and L2 indicated by the broken line in FIG. 9 to the right direction (negative direction) by a predetermined angle. In FIG. 9, the predetermined angle is 20 degrees. That is, the straight lines L1R and L2R illustrated in FIG. 9 are obtained by rotating the straight lines L1 and L2, respectively, to the right direction (negative direction) by 20 degrees.

In the left hand determination criterion illustrated in FIG. 9, the four regions divided by the two straight lines L1R and L2R are associated with the upward direction, the downward direction, the rightward direction and the left ward direction, respectively. Specifically, of four regions divided by the two straight lines L1R and L2R, the region of −65 to 25 degrees, the region of 25 to 115 degrees, the region of 115 to 205 degrees and the region of 205 to 295 degrees are associated with the rightward direction, the upward direction, the leftward direction and the downward direction, respectively.

When the left hand determination criterion illustrated in FIG. 9 is used, the controller 11 can determine, when a vector of a gesture calculated based on the output from the proximity sensor 18 is the direction of 90 degrees as indicated by the arrow A1, that the gesture is an upward gesture. Further, the controller 11 can also determine, when a vector of a gesture calculated based on the output from the proximity sensor 18 is the direction of 30 degrees as indicated by the arrow A2, that the gesture is an upward gesture. That is, when using a standard determination criterion, the gesture in the direction of 30 degrees indicated by the arrow A2 is determined as a rightward gesture, however, when using the left hand determination criterion, it is determined as an upward gesture.

When a gesture is made with a left hand, as described above, the rightward component is likely to be included with respect to the upward gesture. When a gesture made by the user with an intention of upward operation includes the rightward component, and if the gesture is determined as a gesture in the direction of 30 degrees indicated by the arrow A2, the controller 11 determines the gesture as a rightward gesture when using a standard determination criterion. However, since the gesture intended by the user is an upward gesture, the determination that the gesture is a rightward gesture may cause erroneous operation. On the contrary, even with the same gesture, when using the left hand determination criterion, the controller 11 determines the gesture as an upward gesture. Thus, use of the left hand determination criterion may allow the controller 11 to perform a control intended by the user more easily. Thus, according to the electronic device 1, erroneous operation can be easily prevented in input operation with a gesture.

Figure 10:
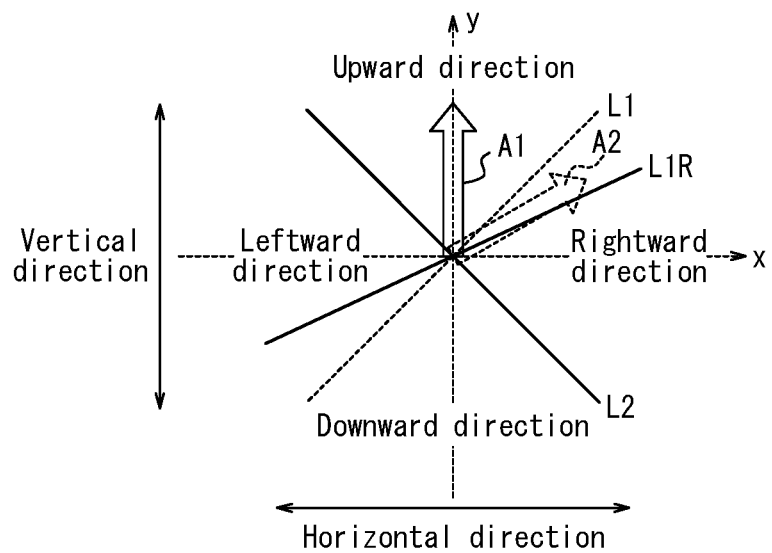
FIG. 10 is a diagram illustrating another example of a left hand determination criterion.

FIG. 10 is a diagram illustrating another example of the left hand determination criterion. The left hand determination criterion illustrated in FIG. 10 includes two straight lines L1R and L2. The straight line L1R is obtained by rotating the straight line L1 to the right direction (negative direction) by a predetermined angle (e.g. 20 degrees). The straight line L2 is the same straight line described with reference to FIG. 6.

In the left hand determination criterion illustrated in FIG. 10, the four regions divided by the two straight lines L1R and L2R are associated with the upward direction, the downward direction, the rightward direction and the leftward direction, respectively. Specifically, of four regions divided by the two straight lines L1R and L2R, the region of −45 to 25 degrees, the region of 25 to 135 degrees, the region of 135 to 205 degrees and the region of 205 to 315 degrees are associated with the rightward direction, the upward direction, the leftward direction and the downward direction, respectively.

Even when the left hand determination criterion illustrated in FIG. 10 is used, the controller 11 determines the gesture in the direction of 90 degrees indicated by the arrow A1 as an upward gesture, and the gesture in the direction of 30 decrees indicated by the arrow A2 as an upward gesture. Thus, even when the left hand determination criterion illustrated in FIG. 10 is used, the controller 11 is also easily perform the control intended by the user, as with the case where the left hand determination criterion illustrated in FIG. 9 is used. In this manner, according to the electronic device 1, erroneous operation can be easily prevented when input operation is performed with a gesture.

When a gesture is made with a left hand, because of the structure of human body, even if the user intentionally makes a gesture in any of up, down, left and right directions, the gesture is hard to be detected as a gesture that includes a lower right direction component and an upper left direction component. Thus, also in the left hand determination criterion, with respect to the straight line L2 that forms a boundary from the lower right direction to the upper left direction, the same straight line as that of the standard determination criterion. illustrated in FIG. 10, can be used.

When the hand used for making a gesture is a right hand, the controller 11 uses a right hand determination criterion to determine the direction of the gesture. The right hand determination criterion is a determination criterion that facilitates determination of the direction of the gesture according to the intention of the user when operation is performed with a right hand, in consideration of the nature of movement with a right hand. The nature of the right-hand movement is symmetrical to the left-hand movement, and includes a nature that the leftward component is likely to be included with respect to the upward operation. The nature of the right-hand movement includes a nature that the rightward component is likely to be included with respect to the downward operation.

Figure 11:
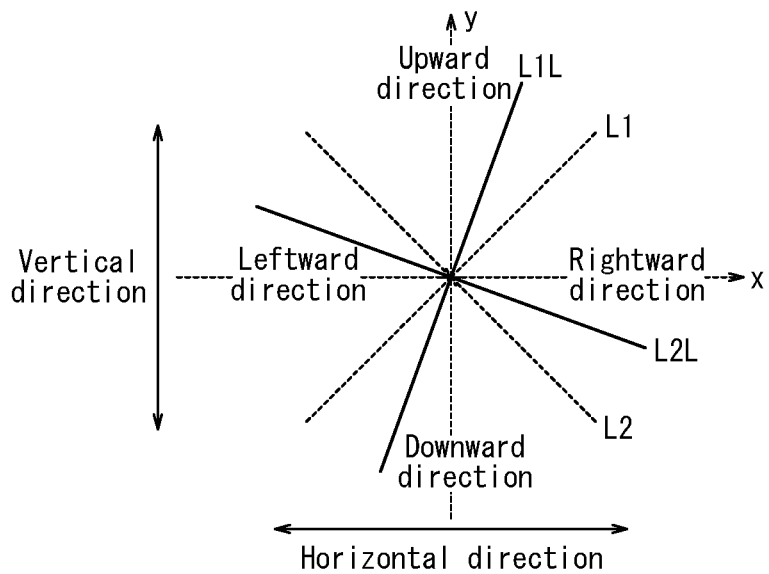
FIG. 11 is a diagram illustrating an example of a right hand determination criterion.

FIG. 11 is a diagram illustrating an example of a right hand determination criterion. The right hand determination criterion includes two straight lines L1L and L2L, as illustrated as an example in FIG. 11. The straight lines L1L and L2L are obtained by rotating the straight lines L1 and L2 indicated by broken line in FIG. 6 to the left direction (positive direction) by a predetermined angle. In FIG. 11, the predetermined angle is 20 degrees. That is, the straight lines L1L and L2L illustrated in FIG. 11 are obtained by rotating the straight lines L1 and L2, respectively, to the left direction (positive direction) by 20 degrees.

In the right hand determination criterion illustrated in FIG. 11, the four regions divided by the two straight lines L1L and L2L are associated with the upward direction, the downward direction, the rightward direction and the leftward direction, respectively. Specifically, of four regions divided by the two straight lines L1L and L2L, the region of −25 to 65 degrees, the region of 65 to 155 degrees, the region of 155 to 245 degrees and the region of 245 to 335 degrees are associated with the rightward direction, the upward direction, the leftward direction and the downward direction, respectively.

When the right hand determination criterion illustrated in FIG. 11 is used, the controller 11 can easily perform a control intended by the user with respect to the gesture made by a right hand, for the same reason as described in detail with respect to the above described left hand determination criterion.

Figure 12:
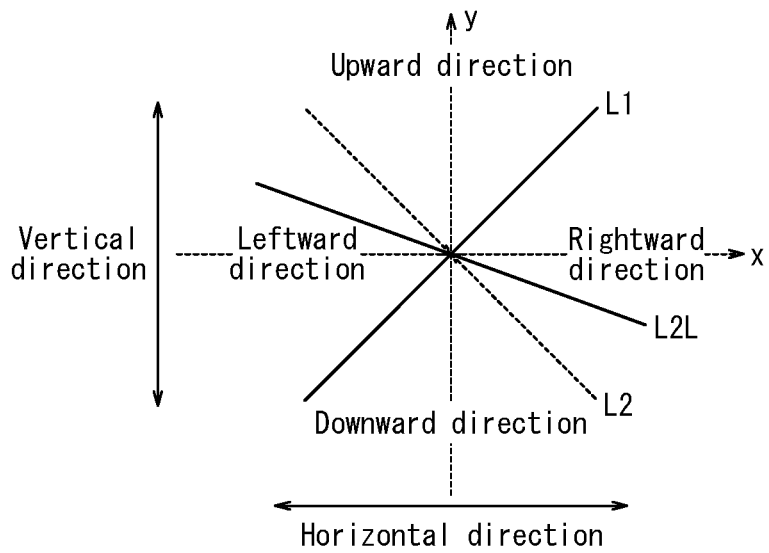
FIG. 12 is a diagram illustrating another example of a right hand determination criterion.

FIG. 12 is a diagram illustrating another example of the right hand determination criterion. The right hand determination criterion illustrated in FIG. 12 includes two straight lines L1 and L2L. The straight line L2L is obtained by rotating the straight line L2 to the left direction (positive direction) by a predetermined angle (e.g. 20 degrees). The straight line L1 is the same straight line as described with reference to FIG. 6.

In the right hand determination criterion illustrated in FIG. 12, the four regions divided by the two straight lines L1 and L2L are associated with the upward direction, the downward direction, the rightward direction and the leftward direction, respectively. Specifically, of four regions divided by the two straight lines L1 and L2L, the region of −25 to 45 degrees, the region of 45 to 155 degrees, the region of 155 to 225 degrees and the region of 225 to 335 degrees are associated with the rightward direction, the upward direction, the leftward direction and the downward direction, respectively.

Even when the right hand determination criterion illustrated in FIG. 12 is used, the controller 11 can easily perform a control intended by the user with respect to the gesture made by a right hand, for the same reason as described in detail with respect to the above described left hand determination criterion. Thus, according to the electronic device 1, erroneous operation can be easily prevented in input operation with a gesture.

In the description of FIGS. 9 to 12, a case where the rotation angle of the straight lines constituting the determination criterion (a predetermined angle) is 20 degrees is described. However, the predetermined angle is not limited to 20 degrees. The predetermined angle may be any angle with which the direction of the gesture is easy to be determined to the direction intended by the user.

Further, the left hand determination criterion and the right hand determination criterion are not limited to those illustrated in FIGS. 9 to 12. The left hand determination criterion and the right hand determination criterion can be any criterion with which the direction of the gesture is easy to be determined to the direction intended by the user, according to the hand used for making a gesture.

Flow of Processing Performed by Controller

Figure 13:
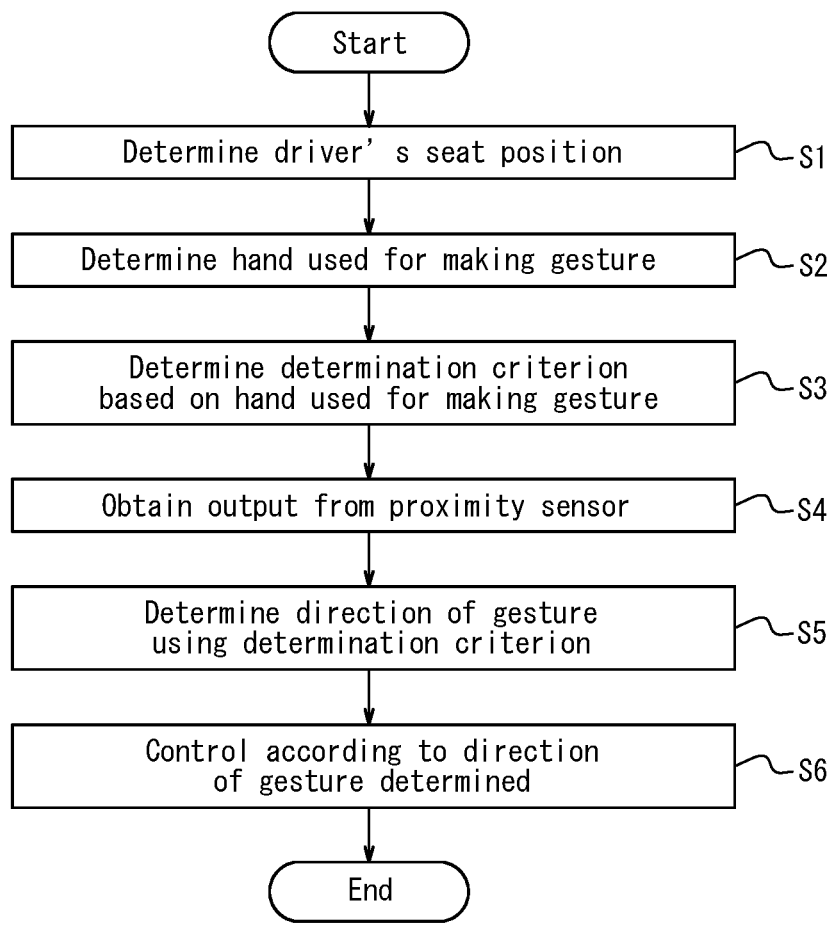
FIG. 13 is a flowchart illustrating an example of processing performed by a controller of the electronic device

FIG. 13 is a flowchart illustrating an example of the processing performed by the controller 11 of the electronic device 1.

The controller 11 determines a driver's seat position in a car by the method described above (step S1).

The controller 11 determines a hand of the user used for operating an own device, that is, a hand used for making a gesture, based on the driver's seat position determined in step S1 (step S2).

The controller 11 determines, in a state where the hand used for making a gesture is determined in step S2, a determination criterion used for determining the direction of the gesture, based on the hand used for making a gesture (step S3).

The controller 11 obtains output from the proximity sensor 18 (step S4).

The controller 11 determines the direction of the gesture, based on the output from the proximity sensor 18 obtained in step S4, using the determination criterion determined in step S3 (step S5).

The controller performs control according to the direction of the gesture determined in step S5 (step S6).

As described above, in the electronic device 1 according to this embodiment, the hand of the user used for making a gesture is determined according to the driver's seat position, and according to the determined hand of the user used for making a gesture, the direction of the gesture made by the user is determined based on the output from the proximity sensor 18. Thus, it is easier for the electronic device 1 to detect the gesture made by the user as an operation intended by the user. In this manner, erroneous operation can be easily prevented in input operation with a gesture. Further, if erroneous operation occurs in the input operation with a gesture while driving, a user driving a car may shift his/her gaze to the display 14 to grasp the content of the processing based on the input operation. According to the electronic device 1 of this embodiment, it is easy to prevent the gaze of the user from being shifted to the display 14 by preventing erroneous operation. Thus the user can easily concentrate on driving, and driving safety is improved.

Other Embodiments

Although this disclosure has been described based on the drawings and embodiments, it is to be noted that various changes and modifications can be easily made by those skilled in the art based on this disclosure. Therefore, such changes and modifications are to be understood as included within the scope of this disclosure. For example, the functions and the like included in each units or step may be reordered in any logically consistent way. Further, units, steps and the like may be combined into one or divided.

In the above embodiment, although the gesture has been described to be detected by the proximity sensor 18, the gesture does not necessarily have to be detected by the proximity sensor 18. The gesture may be detected by any sensor that can detect a user's gesture without touching the own device. An example of such sensor includes the camera 13 and the like, for example.

The sensor that can detect a user's gesture without touching the own device may include a distance measurement sensor, for example. For example, the electronic device 1 may include, instead of the proximity sensor 18, or with the proximity sensor 18, the distance measurement sensor, and a gesture may be detected by the distance measurement sensor.

The distance measurement sensor is a sensor that can measure a distance to an object. The distance measurement sensor may be configured as a Time of Flight (ToF) sensor. The distance measurement sensor configured as a ToF sensor includes an optical emitter configured to irradiate sine wave modulated light (infrared laser light) to an object and an optical detector configured to receive reflected infrared laser light from the object. The optical detector has an image sensor in which a plurality of light receiving elements are disposed, for example. The ToF sensor measures the time (flight time) from irradiation of infrared laser light to reception of reflection light at each light receiving element. The ToF sensor can measure the flight time based on the phase difference between the irradiated infrared laser light and the received reflected light. The ToF sensor can measure the distance to the object that reflects the infrared laser light irradiated, based on the measured flight time. The ToF sensor can detect the moving direction of the object based on the difference in time at which the reflected light from the object enters each of a plurality of light receiving elements. In this manner, the ToF sensor can also detect the gesture made by the user based on the same principle as that described with respect to the proximity sensor 18. The distance measurement sensor may be disposed on the same surface as that on which the proximity sensor 18 is disposed, for example, in the electronic device 1.

Figure 14:
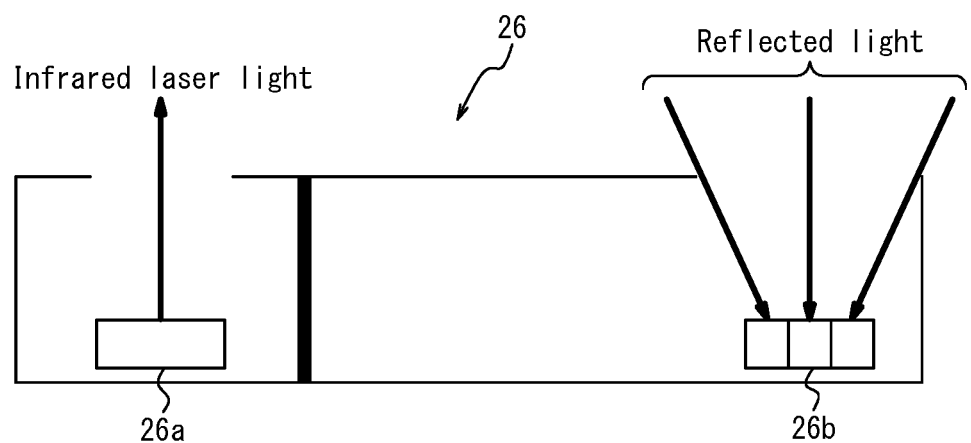
FIG. 14 is a diagram schematically illustrating a distance measurement sensor.
Figure 15:
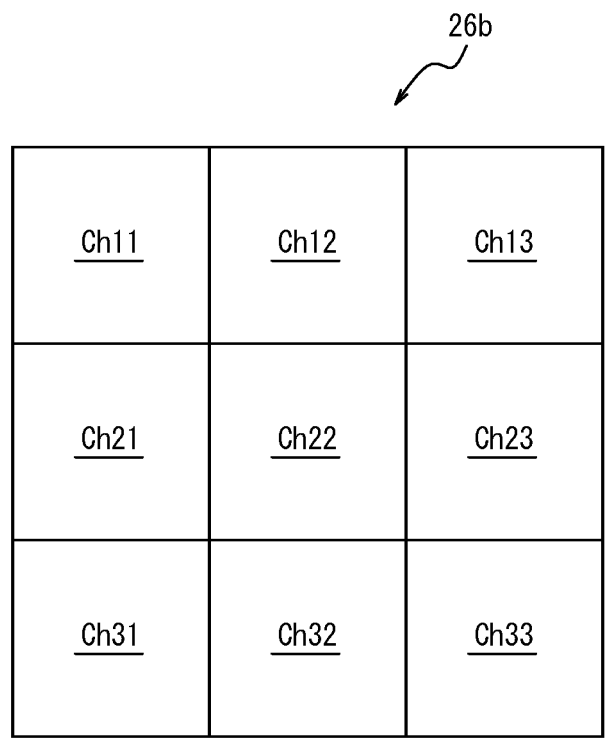
FIG. 15 is a diagram schematically illustrating an example of arrangement of light receiving elements in a light receiving portion illustrated in FIG. 14.

Here, a method in which the controller 11 detects a user's gesture based on the output from the distance measurement sensor will be described with reference to FIGS. 14 to 16. FIG. 14 is a diagram schematically illustrating a distance measurement sensor 26. FIG. 14 illustrates the distance measurement sensor 26 in a side view. The distance measurement sensor 26 includes an optical emitter 26a and an optical detector 26b. It is assumed that the optical emitter 26a and the optical detector 26b are disposed substantially parallel to the longitudinal direction of the electronic device 1. The optical emitter 26a irradiates infrared laser light to the object. The optical detector 26b receives reflected infrared light from the object.

The optical detector 26b may include a plurality of light receiving elements. For example, the optical detector 26b may include 9 light receiving elements arranged in 3 rows and 3 columns as illustrated in FIG. 15. The 9 light receiving elements each receives reflected light from the object. In the upper stage of the optical detector 26b, three light receiving elements of Ch11, Ch12 and Ch13 are disposed in order from the left in a direction substantially parallel to the longitudinal direction of the electronic device 1. In the middle stage of the optical detector 26b, three light receiving elements of Ch21, Ch22 and Ch23 are disposed in order from the left in a direction substantially parallel to the longitudinal direction of the electronic device 1. In the lower stage of the optical detector 26b, three light receiving elements of Ch31, Ch32 and Ch33 are disposed in order from the left in a direction substantially parallel to the longitudinal direction of the electronic device 1.

The distance measurement sensor 26 can measure the distance from each of 9 light receiving elements to the object based on the phase difference between the infrared laser light irradiated by the optical emitter 26a and the reflected light received by each of the 9 light receiving elements of the optical detector 26b. The distance measurement sensor 26 can detect a gesture based on the distance from each of the 9 light receiving elements to the object and the change in the distance over time.

For example, assuming that the user makes a gesture of moving his/her hand from left to right. At this time, for example, the distances to the object detected by the light receiving elements Ch21, Ch22 and Ch23 in the middle stage, for example, are defined as D21, D22 and D23, respectively. FIG. 16 is a diagram schematically illustrating a distance to the object detected by each light receiving element. For example, as schematically illustrated in FIG. 16, a hand, which is an object, first comes close to the light receiving element Ch21 disposed on the left side. Thus the distance D21 from the object detected by the light receiving element Ch21 is reduced. After that, when a hand, which is an object, comes close to the light receiving element Ch22 disposed in the center, the distance D22 from the object detected by the light receiving element Ch22 is reduced. Finally, when a hand, which is an object, moves to the right side, the distance D23 from the object detected by the light receiving element Ch23 disposed on the right side is reduced. The hand coming close to each of the light receiving elements of Ch21, Ch22 and Ch23 moves away therefrom in the order of Ch21, Ch22 and Ch23. Thus each distance of D21, D22 and D23 is increased in this order (return to the initial value). The gesture in the vertical direction can also be detected by the same principle, for example, using the light receiving elements Ch12, Ch22 and Ch32 disposed in the lateral direction, for example. In this manner, the distance measurement sensor 26 can detect a gesture based on the distance from each of the 9 light receiving elements to the object and the change in the distance over time It is to be noted that, here, although an explanation has been given assuming that the optical detector 26b includes 9 light receiving elements, the number of the light receiving elements included in the optical detector 26b is not limited thereto. Disposition of the light receiving elements is not limited to that illustrated in FIG. 15. The number and disposition of the light receiving elements included in the optical detector 26b may be determined appropriately according to the type of the gesture detected.

Further, the optical emitter 26a of the distance measurement sensor 26 may include a plurality of light emitting elements. In this case, a distance from each of 9 light emitting elements to the object can be measured based on the phase difference between the infrared laser light emitted from each light emitting element and the reflected light received by the optical detector 26b. Even in this case, the distance measurement sensor 26 can detect a gesture by applying the above described principle based on the distance from each of the 9 light emitting elements to the object and a change in the distance over time.

In the above embodiment, the controller 11 may change the detection range of the gesture by the proximity sensor 18 according to the driver's seat position determined. The detection range of the gesture may include the direction that can be detected by the proximity sensor 18. For example, assuming that the proximity sensor 18 is provided movable in the horizontal direction in the console panel, the controller 11 may control such that the proximity sensor 18 is directed to the direction of the driver's seat determined. That is, for example, when determining that the driver's seat is located on the right side in the traveling direction, the controller 11 may turn the proximity sensor 18 to the right side in the traveling direction. Similarly, when determining that the driver's seat is located on the left side in the traveling direction, the controller 11 may turn the proximity sensor 18 to the left side in the traveling direction. In the proximity sensor 18, the viewing angle capable of detecting a gesture is limited. Thus, even if the user makes a gesture, the user's gesture is not detected if it is out of the range that can be detected by the proximity sensor 18. However, by changing the detection range of the proximity sensor 18 and turning the detection range of the proximity sensor 18 to the direction of the driver's seat in which the user sits, for example. the proximity sensor 18 can easily detect a user's gesture. When the proximity sensor 18 detects a user's gesture easily, input by a gesture is less likely to be missed. Thus the user can concentrate on driving further, and as a result the driving safety is improved.

Much of the subject matter in this disclosure is described as a series of operations executed by a computer system and other hardware that can execute program instructions. Examples of the computer system and other hardware include, for example, a general-purpose computer, a Personal Computer (PC), a dedicated computer, a workstation, a Personal Communications System (PCS), a mobile (cellular) phone, a mobile phone provided with a data processing function, a RFID receiver, a game machine, an electronic notepad, a laptop computer, a Global Positioning System (GPS) receiver or other programmable data processing apparatuses. It should be noted that, in each embodiment, various operations or control methods are executed by a dedicated circuit (for example, individual logical gates interconnected in order to execute a particular function) implemented by program instructions (software), or by a logical block and/or program module executed by one or more processors, and the like. The one or more processors that execute a logical block and/or program module, and the like, include, for example, one or more microprocessors, central processing unit (CPU), Application Specific Integrated Circuit (ASIC), Digital Signal Processor (DSP), Programmable Logic Device (PLD), Field Programmable Gate Array (FPGA), processor, controller, microcontroller, microprocessor, electronic device, other apparatuses designed to be capable of executing the functions described herein, and/or a combination of any of these. The embodiment described herein is, for example, implemented by hardware, software, firmware, middleware, microcode, or a combination of any of these. The instruction may be a program code or a code segment for executing necessary tasks. The instruction can then be stored in a machine readable non-transitory storage medium and other media. Code segments may be a combination of any of procedure, function, subprogram, program, routine, subroutine, module, software package, class or instruction, data structure or program statement. The code segment sends and/or receives information, data argument, variable or stored contents with the other code segment or hardware circuit, and as a result the code segment is connected to the other code segment or hardware circuit.

The storage 16 used here may also be configured as a computer-readable, tangible carrier (medium) in the categories of solid-state memory, magnetic disks, and optical disks. An appropriate set of computer instructions, such as program modules, for causing a processor to execute the techniques disclosed herein or data structures are stored on these media. Examples of computer-readable media include an electrical connection with one or more wires, a magnetic disk storage medium, a magnetic cassette, a magnetic tape, or other magnetic or optical storage medium (such as a Compact Disc (CD), a laser Disc®, a Digital Versatile Disc (DVD®), a Floppy® disc and a Blu-ray Disc®, a portable computer disc, a Random Access Memory (RAM), a Read-Only Memory (ROM), a rewritable programmable ROM such as an Erasable Programmable Read-Only Memory (EPROM), an Electrically Erasable Programmable Read-Only Memory (EEPROM), or a flash memory, another tangible storage medium that can store information, or a combination of any of these. The memory can be provided internal and/or external to a processor or a processing unit. As used herein, a term of "memory" refers to all types of long-term storage, short-term storage, volatile, non-volatile, or other memories. That is, the "memory" is not limited to specific types and/or numbers. Further, the type of the medium on which memory is stored is not limited.

REFERENCE SIGNS LIST

1 Electronic device
11 Controller
12 Timer
13 Camera
14 Display
15 Microphone
16 Storage
17 Communication unit
18 Proximity sensor
19 UV sensor
20 Illuminance sensor
21 Acceleration sensor
22 Geomagnetic sensor
23 Pressure sensor
24 Gyro sensor
25 Speaker
26 Distance measurement sensor
26*a* Optical emitter
26*b* Optical detector
30 Car
31, 32, 33, 34 Seat
180 Infrared LED for light source
181 Lens
SU, SR, SD, SL Photodiode

The invention claimed is:
1. An electronic device, comprising:
 a sensor configured to detect a gesture without touching an own device; and
 a controller configured to determine a hand of a user used for operation according to a driver's seat position and determine, according to the hand of the user used for operation, a direction of the gesture, based on an output from the sensor, the direction of the gesture being in any direction parallel to a surface of the sensor facing the user, wherein the controller is configured to determine whether the driver's seat position is on a left side or a right side with respect to a forward traveling direction, determine the hand of the user used for operation according to whether the driver's seat position is on the left side or the right side with respect to the forward traveling direction, and change a detection range of the gesture by the sensor according to whether the driver's seat position is on the left side or the right side.

2. The electronic device according to claim 1, wherein the controller determines a hand opposite the driver's seat position as the hand of the user used for operation.

3. The electronic device according to claim 1, wherein the controller determines the driver's seat position based on a direction in which a gesture is first detected after a power is supplied to the electronic device.

4. The electronic device according to claim 3, wherein the controller determines that the driver's seat position exists in the direction in which a gesture is first detected.

5. The electronic device according to claim 1, wherein the controller determines a determination criterion for determining a direction of the gesture according to the hand of the user used for operation, and determines the direction of the gesture using the determined determination criterion.

6. The electronic device according to claim 5, wherein the controller determines, when the hand of the user used for operation is a right hand, a direction of the gesture using a right hand determination criterion.

7. The electronic device according to claim 5, wherein the controller determines, when the hand of the user used for operation is a left hand, a direction of the gesture using a left hand determination criterion.

8. A moving body comprising an electronic device according to claim 1.

9. The moving body communicably connected with the electronic device according to claim 1.

10. The electronic device according to claim 1, wherein the controller is further configured to determine whether the hand of the user used for operation is a left hand or a right hand of the user according to the driver's seat position and determine, according to whether the hand of the user used for operation is the left hand or the right hand, the direction of the gesture, based on the output from the sensor.

11. The electronic device according to claim 10, wherein when the controller determines the hand of the user used for operation is the left hand of the user, the controller determines the direction of the gesture using a left hand determination criterion, and when the controller determines the hand of the user used for operation is the right hand of the user, the controller determines the direction of the gesture using a right hand determination criterion, the left hand determination criterion being different than the right hand determination criterion.

12. A non-transitory computer-readable recording medium storing computer program instructions, which when executed by an electronic device comprising a sensor configured to detect a gesture without touching an own device and a controller, cause the electronic device to:
determine a hand of a user used for operation according to a driver's seat position;
determine, according to the hand of the user used for operation, a direction of the gesture based on an output from the sensor, the direction of the gesture being in any direction parallel to a surface of the sensor facing the user; and
determine whether the driver's seat position is on a left side or a right side with respect to a forward traveling direction, determine the hand of the user used for operation according to whether the driver's seat position is on the left side or the right side with respect to the forward traveling direction, and change a detection range of the gesture by the sensor according to whether the driver's seat position is on the left side or the right side.

13. A control method performed by an electronic device comprising a sensor configured to detect a gesture without touching an own device and a controller, the method comprising the steps of:
determining a hand of a user used for operation according to a driver's seat position;
determining, according to the hand of the user used for operation, a direction of the gesture based on an output from the sensor, the direction of the gesture being in any direction parallel to a surface of the sensor facing the user; and
determining whether the driver's seat position is on a left side or a right side with respect to a forward traveling direction, determining the hand of the user used for operation according to whether the driver's seat position is on the left side or the right side with respect to the forward traveling direction, and changing a detection range of the gesture by the sensor according to whether the driver's seat position is on the left side or the right side.

* * * * *